Patented Feb. 9, 1943

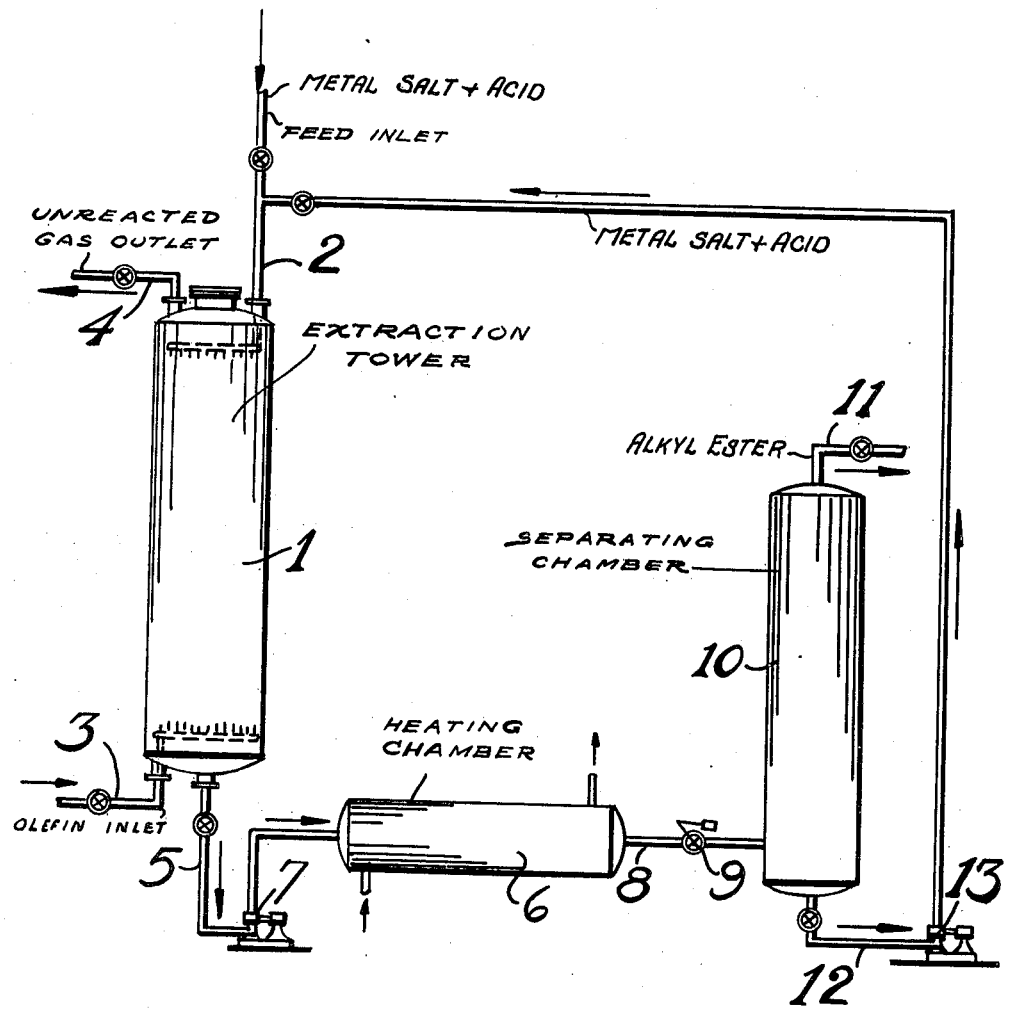

2,310,283

UNITED STATES PATENT OFFICE 2,310,283

PREPARATION OF ALKYL ESTERS

Edwin R. Gilliland, Cambridge, Mass., assignor to Standard Oil Development Company, a corporation of Delaware Application December 22, 1938, Serial No. 247,196

10 Claims. (Cl. 260—497)

This invention relates to the preparation of alkyl esters and relates particularly to a process in which olefins are selectively esterified.

Unsaturated gases, in particular those formed by the cracking of petroleum hydrocarbons, are obtained as a mixture of hydrocarbons that are normally gaseous and liquid at room temperature. By means of fractionation, the desirable normally gaseous hydrocarbons may be separated from the hydrocarbons having a higher or lower number of carbon atoms to the molecule. The fractions thereby obtained consist of both saturated and unsaturated hydrocarbons.

An object of this invention is to prepare alkyl esters from a mixture of olefins and saturated hydrocarbons by selectively absorbing the olefin in a solution containing the acid whose ester is to be prepared and containing a metal salt capable of forming an addition compound with the olefin. Silver nitrate, cuprous and mercury salts are examples of the metal salts capable of forming these addition complexes.

These and other objects of the invention will be more readily understood if read with reference to the accompanying drawing in which is shown the flow of materials.

Referring to the drawing, which illustrates the preparation of ethyl chloride, numeral 1 indicates an extraction tower into which is passed by means of pipe 2 a mixture of a metallic salt, such as a metal halide, for example cuprous chloride, and an acid with which the olefin is to be reacted, for example, a slurry and/or solution of cuprous chloride in hydrochloric acid. The cuprous chloride may be partly in solution in a hydrochloric acid solution of 5 to 35% concentration. The preferred concentration range of hydrochloric acid is from about 10 to 30%. Into the bottom of this extraction tower by means of pipe 3 is passed a mixture of saturated and unsaturated hydrocarbons, for example, a mixture of hydrocarbons having 2 carbon atoms to the molecule and containing about 25% ethylene. The ethylene in the gaseous mixture, on passing countercurrently to the mixture of cuprous chloride and hydrochloric acid, reacts with the cuprous chloride to form an addition compound. The unreacted gases consisting substantially of the saturated hydrocarbons are removed from the extraction tower by means of outlet 4 and are scrubbed to remove hydrochloric acid (not shown). The cuprous chloride solution containing the ethylene in combination together with the hydrochloric acid is passed through pipe 5 into a heating chamber 6. Pump 7 is used to place the mixture of olefin, cuprous chloride and hydrochloric acid under pressure. Heating chamber 6 is maintained at an elevated temperature, such as 50° to 200° C. The olefin at this temperature combines with the halide of the hydrochloric acid to form ethyl chloride. Any suitable means may be used to maintain heat chamber 6 at the desired temperature.

The mixture of ethyl chloride, cuprous chloride and hydrogen which is liberated then passes through pipe 8 provided with a pressure relief valve 9 into separating chamber 10. As the pressure is released, ethyl chloride is removed through pipe 11 and the ethyl chloride condensed thereafter. The cuprous chloride is removed through pipe 12, refortified with hydrochloric acid and by means of pump 13 returns to extraction tower 1.

Other metal salts may be used with the cuprous chloride, for example, zinc chloride, and other acids may be used in place of the hydrochloric acid, for example, hydrobromic, hydroiodic and acetic.

Example 1

800 cc. of a solution, 6 normal in hydrochloric acid, 2.5 normal in cuprous chloride and 3 normal in ammonium chloride, were saturated with pure ethylene at one atmosphere pressure and 0° C. The resulting solution was placed in a glass-lined reactor and heated to 190° C. for two hours. It was then cooled to 80° C. and the pressure reduced, thereby giving 10.6 grams of ethyl chloride and 2 liters (760 mm. and 25° C.) of unreacted ethylene.

Example 2

A slurry of 400 grams of cuprous chloride in 700 cc. of glacial acetic acid was treated with a 50% ethylene-50% hydrogen mixture at 0° C. and 5 atmospheres pressure. The resulting solution was heated at 218° C. for four hours. On cooling and releasing the pressure, 15 liters (760 mm. and 25° C.) of unreacted ethylene were evolved. Distillation of the residual liquid yielded 166 grams of ethyl acetate.

Example 3

A slurry containing 600 cc. of 6 normal hydrochloric acid, 350 grams cuprous chloride and 50 grams of zinc chloride was treated with propylene at 0° C. and 3 atmospheres pressure. This mixture was then heated at 150° C. for two hours. On cooling and releasing pressure, 4.5 liters (760 mm. and 25° C.) of unreacted propylene and 130 grams of isopropyl chloride were evolved.

The invention is not to be limited to the specific embodiments shown or the specific examples given, nor to any theories advanced as to the operation of the invention.

I claim:

1. A process of producing ethyl chloride, which comprises contacting a mixture of ethylene and saturated hydrocarbons with cuprous chloride and hydrochloric acid at a temperature of 0° C., separating a mixture of the acid, the cuprous chloride and cuprous chloride addition compounds, from the mixture of unreacted ethylene and saturated hydrocarbons, heating the separated mixture of acid, cuprous chloride and cuprous chloride addition compounds under pressure to a temperaure of about 50° C. to 200° C., and thereafter separating the ethyl chloride.

2. A process of producing ethyl chloride according to claim 1, in which the mixture of cuprous chloride and cuprous chloride addition compounds and acid is maintained at an elevated temperature 2 hours.

3. A process of producing ethyl acetate, which comprises contacting a mixture of ethylene and saturated hydrocarbons with cuprous chloride and acetic acid at a temperature of 0° C., at a pressure of 1 to 5 atmospheres, separating a mixture of the acetic acid, the cuprous chloride and the cuprous chloride addition compounds, from the mixture of unreacted ethylene and saturated hydrocarbons, heating the separated mixture of acetic acid, cuprous chloride and cuprous chloride addition compounds under pressure to a temperature of about 218° C., and thereafter separating ethyl acetate.

4. A process of manufacturing alkyl esters, which comprises contacting a mixture of olefins and saturated hydrocarbons with cuprous halide and an acid at a temperature at which the olefins do not readily react with the acid, separating a mixture of the acid, the cuprous halide and the metal salt addition compounds from the mixture of unreacted olefins and saturated hydrocarbons and heating the separated mixture of acid, cuprous halide and cuprous halide addition compounds under pressure.

5. A process of manufacturing alkyl esters, which comprises contacting a mixture of olefins and saturated hydrocarbons with a slurry of cuprous chloride and an acid at a tempertaure at which the olefins do not readily react with the acid, separating a mixture of the acid, the cuprous chloride and the addition compounds produced therein, heating the separated mixture of acid, cuprous chloride and the addition compound produced therein under pressure, lowering the pressure and condensing the alkyl esters from the vapors.

6. A process of manufacturing alkyl esters, which comprises contacting a mixture of olefins and saturated hydrocarbons with a solution of cuprous halide dissolved in an acid at a temperature at which the olefins do not readily react with the acid, separating the acid solution from the mixture of unreacted olefins and saturated hydrocarbons, heating the separated mixture of acid solution under pressure, lowering the pressure and separating alkyl esters.

7. A process of manufacturing alkyl esters, which comprises contacting a mixture of olefins and saturated hydrocarbons with a slurry of a cuprous halide suspended in an acid solution at a temperature at which the olefins do not readily react with the acid, separating a mixture of the acid, the cuprous halide and cuprous halide addition compounds from the mixture of unreacted olefins and saturated hydrocarbons, heating the separated mixture of acid, cuprous halide and cuprous halide addition compounds under pressure, lowering the pressure, and separating alkyl esters.

8. A process of producing ethyl chloride, which comprises contacting a mixture of ethylene and saturated hydrocarbons with cuprous chloride and hydrochloric acid at a temperature at which the ethylene does not readily react with the acid, separating a mixture of the acid, the cuprous chloride and cuprous chloride addition compounds from the mixture of unreacted ethylene and saturated hydrocarbons, heating the separated mixture of acid, cuprous chloride and cuprous chloride addition compounds under pressure and separating ethyl chloride.

9. A process of preparing isopropyl chloride, which comprises contacting a mixture of propylene and saturated hydrocarbons with cuprous chloride and hydrochloric acid at a temperature at which the propylene does not readily react with the acid, separating a mixture of the acid, the couprous chloride and the cuprous chloride addition compounds, heating the separated mixture of acid, cuprous chloride and cuprous chloride addition compounds under pressure, lowering the pressure and condensing isopropyl chloride from the vapors evolved therefrom.

10. The process of manufacturing alkyl esters which comprises contacting a mixture of olefins and saturated hydrocarbons with a slurry of a cuprous halide with some zinc halide added to it suspended in an acid solution, which cuprous halide forms addition compounds with the olefins and which acid does not react readily with the olenfis at the contacting temperature which is 0° C. at a pressure of about 1 to 5 atmospheres, separating a mixture of the acid, the cuprous halide and the cuprous addition compounds from the mixture of unreacted olefins and saturated hydrocarbons, heating the separated mixture of acid, cuprous halide and cuprous addition compounds under a pressure to a temperature of about 50 to 200° C., lowering the pressure and separating alkyl esters.

EDWIN R. GILLILAND.